(12) United States Patent
Lin

(10) Patent No.: US 10,537,832 B2
(45) Date of Patent: Jan. 21, 2020

(54) FILTER FRAME, FILTER CARTRIDGE, AND ASSEMBLING METHOD OF THE FILTER CARTRIDGE

(71) Applicant: PRO-PURE INC., New Taipei (TW)

(72) Inventor: Hsiang-Chi Lin, New Taipei (TW)

(73) Assignee: PRO-PURE INC., New Taipei (TW)

( * ) Notice: Subject to any disclaimer, the term of this patent is extended or adjusted under 35 U.S.C. 154(b) by 351 days.

(21) Appl. No.: 15/453,894

(22) Filed: Mar. 8, 2017

(65) Prior Publication Data

US 2018/0221791 A1    Aug. 9, 2018

(30) Foreign Application Priority Data

Feb. 6, 2017   (TW) .............................. 106103811 A

(51) Int. Cl.
B01D 27/00    (2006.01)
B01D 29/11    (2006.01)
(Continued)

(52) U.S. Cl.
CPC .......... B01D 27/005 (2013.01); B01D 29/016 (2013.01); B01D 29/111 (2013.01); B01D 35/30 (2013.01); B01D 2201/602 (2013.01)

(58) Field of Classification Search
CPC ...... B01D 27/005; B01D 27/02; B01D 27/04; B01D 27/06; B01D 27/08; B01D 29/016;
(Continued)

(56) References Cited

U.S. PATENT DOCUMENTS 4,065,341 A * 12/1977 Cub .................... B01D 25/001
                                                                156/187
7,658,777 B2 * 2/2010 Kopec ................ B01D 46/0005
                                                                 55/385.3
(Continued)

FOREIGN PATENT DOCUMENTS

DE        25 47 857 A1    5/1977
DE  10 2015 108 947 A1   10/2016
(Continued)

OTHER PUBLICATIONS

English language Abstract of KR 10-2001-0103778 (Nov. 23, 2001).
(Continued)

Primary Examiner — David C Mellon
(74) Attorney, Agent, or Firm — Hershkovitz & Associates, PLLC; Abe Herschkovitz

(57) ABSTRACT

A filter frame, a filter cartridge, and an assembling method of the filter cartridge are provided. The method has the following steps. A filter core and a filter frame are prepared. The filter frame has a glue-cutting segment. Glue is coated around an outer wall of the filter core, and then the filter frame, which is mounted around the filter core, is pushed toward the glue to make the glue-cutting segment press the glue until the glue is cut into two parts. The inner glue part disposed between the filter core and the filter frame seals the filter cartridge. The outer glue part is disposed on an outer side of the filter frame, and is superfluous and removed. The glue-coating is combined with the mounting of the filter frame, thereby saving time and effort.

3 Claims, 17 Drawing Sheets

(51) Int. Cl.
   *B01D 29/01*   (2006.01)
   *B01D 35/30*   (2006.01)

(58) Field of Classification Search
   CPC .................................................. B01D 29/111;
            B01D 35/30; B01D 2201/304; B01D
            2201/34; B01D 2201/347; B01D
            2201/602
   See application file for complete search history.

(56) References Cited

U.S. PATENT DOCUMENTS

| | | | | |
|---|---|---|---|---|
| 7,959,703 B2* | 6/2011 | Merritt | ............... | B01D 46/0001 55/521 |
| 2012/0055127 A1* | 3/2012 | Holzmann | ......... | B01D 46/0001 55/484 |
| 2016/0296861 A1* | 10/2016 | Lin | ..................... | B32B 37/0084 |

FOREIGN PATENT DOCUMENTS

| | | |
|---|---|---|
| JP | 2004-068778 A | 3/2004 |
| JP | 2013-181570 | 9/2013 |
| KR | 10-2001-0103778 | 11/2001 |

OTHER PUBLICATIONS

English language Abstract of JP 2013-181570 (Sep. 12, 2013).
Office Action dated May 28, 2018 in counterpart Application No. KR 10-2017-0039445.
English language translation of the Office Action dated May 28, 2018 in counterpart Application No. KR 10-2017-0039445.
English language Abstract of DE 10 2015 108 947 A1 (Oct. 13, 2016).
English language Abstract of DE 2547857 A1 (May 5, 1977).
English language Abstract of JP 2004-068778 A (Mar. 4, 2004).
Office Action issued in the counterpart Application DE 10 2017 106 645.4 dated Oct. 6, 2017.
Office Action mailed in the counterpart Application JP 2017-052080 dated Nov. 28, 2017.

* cited by examiner

FILTER FRAME, FILTER CARTRIDGE, AND ASSEMBLING METHOD OF THE FILTER CARTRIDGE

CROSS-REFERENCE TO RELATED APPLICATIONS

This application is based upon and claims priority under 35 U.S.C. 119 from Taiwan Patent Application No. 106103811 filed on Feb. 6, 2017, which is hereby specifically incorporated herein by this reference thereto.

BACKGROUND OF THE INVENTION

1. Field of the Invention

The present invention relates to a filter frame, a filter cartridge, and an assembling method of the filter cartridge, which is for filtering suspended particles from fluid.

2. Description of the Prior Arts

A conventional filter cartridge comprises a filter frame and a filter core. The filter core is mounted in the filter frame, and comprises a wavy filtering sheet and a flat filtering sheet. The filtering sheets are rolled into the shape of a cylinder and are alternately stacked to form multiple axial channels, which have the same shape and size. Each of half of the channels is coated with an end sealing adhesive layer at an axial end adjacent to an inlet of the filter core to seal said channel Each one of the other half of the channels is coated with an end sealing adhesive layer at an axial end adjacent to an outlet of the filter core to seal said channel. Therefore, the fluid to be filtered enters half of the channels, flows along said half of the channels, hits the end sealing adhesive layer adjacent to the outlet, and thus passes through the wavy filtering sheet and the flat filtering sheet to the other half of the channels, such that the fluid can leave the filter core. The fluid is filtered to make dust in the fluid attached to the wavy and the flat filtering sheets when the fluid passes through the wavy and the flat filtering sheets.

When the filter cartridge is assembled, the filter core is mounted in the filter frame. The filter core is slightly smaller than the filter frame in outer diameter, thereby forming a gap between the filter core and the filter frame. Then, a head of a glue gun is inserted in the gap to coat glue around an outer wall of the filter core to seal the gap. Thus, the fluid must enter and pass through the filter core. However, the aforementioned assembling method has the following shortcomings.

First, the glue gun must be inserted into the gap between the filter core and the filter frame to make sure the glue actually flows in the gap. However, inserting the head into the gap and moving the head around the gap take time and effort, which lowers the assembling efficiency.

Second, the gap between the filter core and the filter frame must be wide enough for accommodating the head of the glue gun. However, the wide gap also narrows a diameter of the filter core and thus decreases a filtering area of the filter core.

Third, more glue is required to seal the gap since the gap is wide. But this also causes the waste of the glue.

To overcome the shortcomings, the present invention provides a filter frame, a filter cartridge, and an assembling method of the filter cartridge to mitigate or obviate the aforementioned problems.

SUMMARY OF THE INVENTION

The main objective of the present invention is to provide a filter frame, a filter cartridge, and an assembling method of the filter cartridge that can enhance the assembly efficiency by a simple way, and can narrow a gap between a filter core and the filter frame to increase the filter area and to save the use of the glue.

The filter frame comprises a frame body and a glue-cutting segment. The frame body is annular, and has two end openings. The glue-cutting segment is annularly formed around an edge of one of the two end openings of the frame body, and has a transverse outer surface and a transverse inner surface disposed opposite each other. The glue-cutting segment further has at least one annular slope making a distance between the transverse outer surface and the transverse inner surface gradually decrease in a direction away from the frame body.

A filter cartridge comprises a filter core, the filter frame mentioned above, and glue. The filter core has multiple axial channels. The filter frame is mounted around the filter core, and the glue-cutting segment of the filter frame is mounted around an outer wall of the filter core. The glue is coated between the filter frame and the filter core, and extends from a position between the outer wall of the filter core and the frame body to a position between the outer wall of the filter core and the glue-cutting segment. An axial outer end surface of the glue is aligned with an end edge of the glue-cutting segment.

An assembling method of a filter cartridge comprising:
  (a) preparing materials, wherein a filter core and a filter frame are prepared; the filter frame has a frame body and a glue-cutting segment; the frame body is annular and has two end openings; the glue-cutting segment is annularly formed around an edge of one of the two end openings of the frame body;
  (b) coating glue around an outer wall of the filter core;
  (c) pushing the filter frame to cut the glue, wherein the filter frame, which is mounted around the filter core, is pushed toward the glue to make the glue-cutting segment press the glue until the glue is cut into an inner glue part and an outer glue part; the inner glue part is disposed between the filter core and the filter frame, and the outer glue part is disposed on an outer side of the filter frame;
  (d) removing the outer glue part disposed on the outer side of the filter frame.

Because the glue-cutting segment, which has a decreasing width, has the function of cutting glue and is formed on an edge of an end opening of the filter frame, the filter core can be coated with glue in advance, and then the glue is cut when the filter frame is mounted on the filter core. After cutting, part of the glue is squeezed into a position between an outer wall of the filter core and the frame body and the glue-cutting segment of the filter frame, thereby achieving the sealing. The remaining glue is disposed on an outer side of the filter frame, and can be removed directly. As a result, the glue-coating can be combined with the mounting of the filter frame, thereby saving time and effort compared with the conventional method that requires inserting the head of the glue gun in a gap.

In addition, the present invention does not need to insert a glue gun into a position between the filter frame and the filter core, such that it does not need a wide gap between the filter frame and the filter core. Therefore, the diameter and the filtering area of the filter core can be increased.

Furthermore, narrowing the gap between the filter frame and the filter core also decreases the amount of the glue to seal the gap, and the removed glue also can be recycled for use. As a result, the present invention also can save the consumption of glue.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
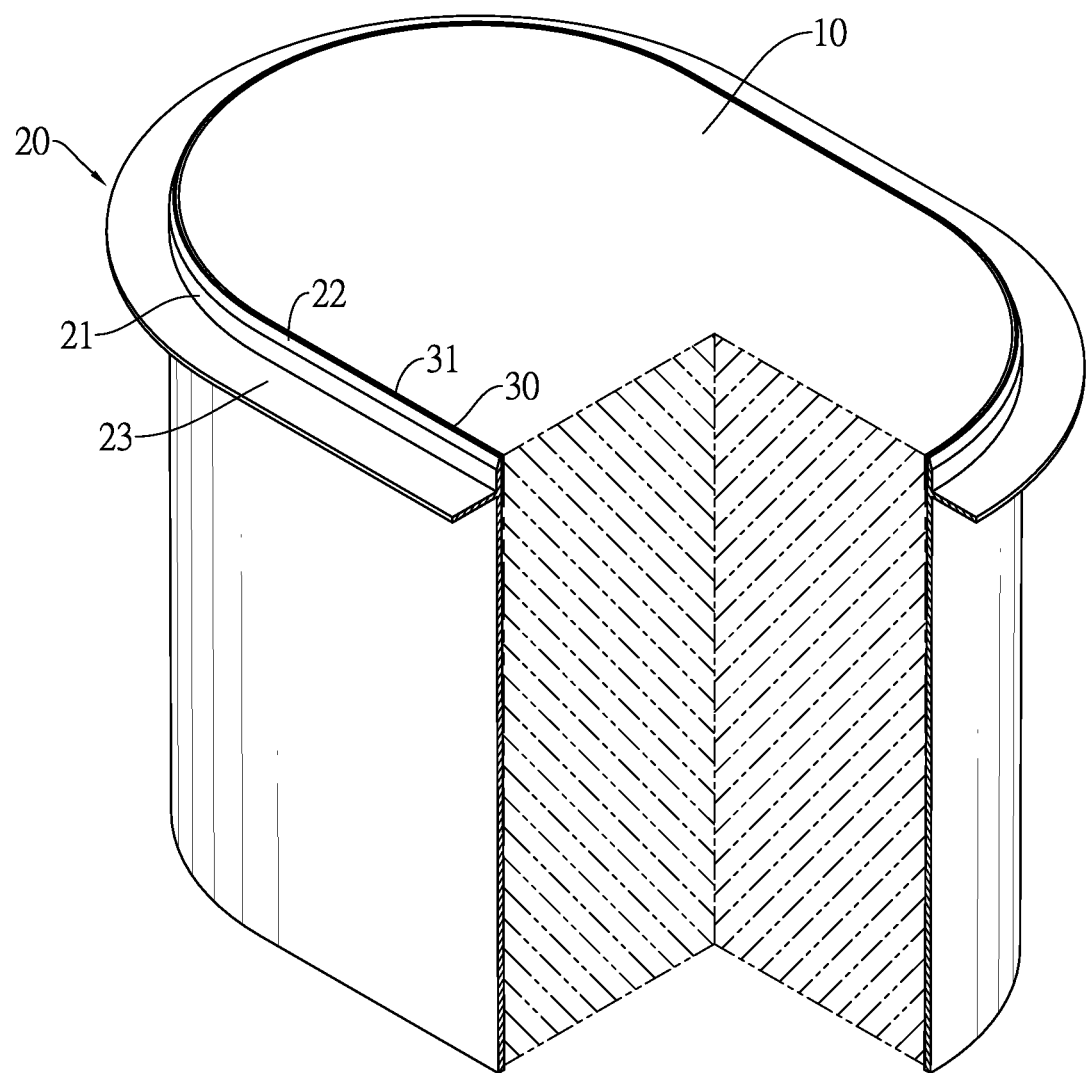
FIG. 1 is a perspective view in partial section of a filter cartridge in accordance with the present invention.

With reference to FIG. 1, a filter cartridge in accordance with the present invention comprises a filter core 10, a filter frame 20, and glue 30.

Types and shapes of the filter core 10 are not limited, as long as the filter core 10 has multiple axial channels and is capable of filtering the fluid pass through the filter core 10. For example, the filter core 10 may be in the shape of a circle or a racetrack.

In a preferred embodiment, the filter core 10 has a wavy filtering sheet and a flat filtering sheet. The filtering sheets are rolled into the shape of a cylinder and are alternately stacked to form multiple axial channels, which have the same shape and size. Each of half of the axial channels is coated with an end sealing adhesive layer at an axial end adjacent to an inlet of the filter core to seal said axial channel. Each one of the other half of the axial channels is coated with an end sealing adhesive layer at an axial end adjacent to an outlet of the filter core to seal said channel Therefore, each one of the axial channels communicates with an exterior environment only via one of the two axial ends. Thus, the fluid entering the axial channel must pass through the wavy filtering sheet or the flat filtering sheet and then can leave the filter core. The fluid is filtered when passing through the wavy filtering sheet or the flat filtering sheet. However, the filter core 10 is by no means limited by the abovementioned and thus the filter core 10 is illustrated schematically in the drawings.

Figure 5:
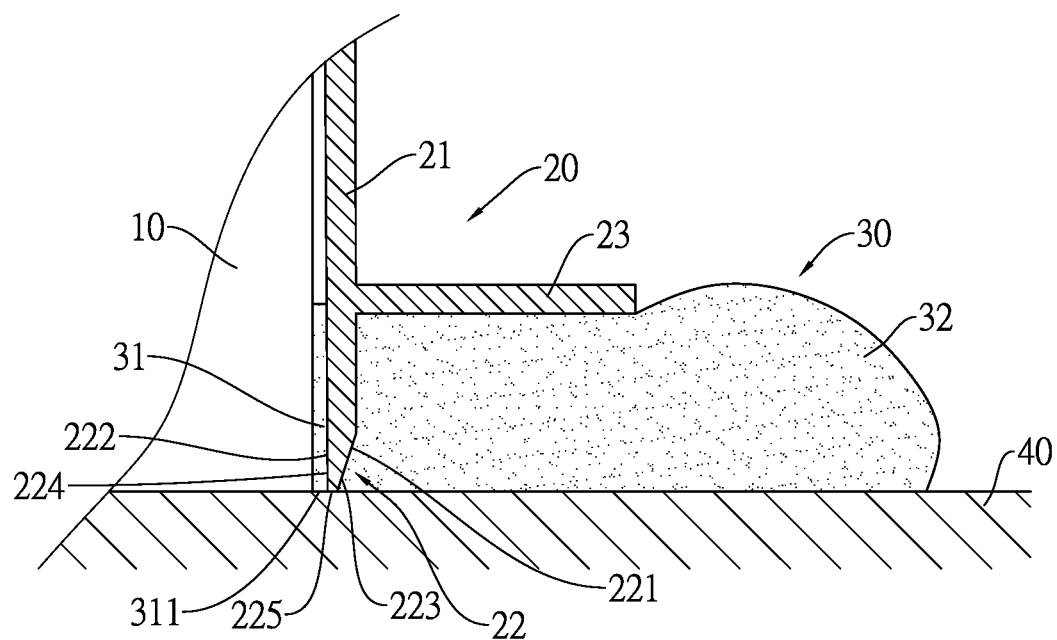
FIG. 5 is a side view in partial section of FIG. 4.

With reference to FIGS. 1 and 5, the filter frame 20 is mounted around the filter core 10, and has a frame body 21, a glue-cutting segment 22, and a flange 23.

The frame body 21 is annular. To be precise, the terms "annular" and "annularly" in the specification mean "looped", and can refer to a circle or a racetrack or any other looped shape. The frame body 21 has two end openings. Part or whole of the frame body 21 is mounted around the filter core 10. The frame body 21 corresponds in shape to the filter core 10, and a gap is formed between the frame body 21 and the filter core 10.

The glue-cutting segment 22 is annularly formed around an edge of one of the two end openings of the frame body 21, and is mounted around an outer wall of the filter core 10. The glue-cutting segment 22 has a transverse outer surface 221 and a transverse inner surface 222 disposed opposite each other.

With reference to FIGS. 5, 7, 9, and 10, in a preferred embodiment, the glue-cutting segment 22 further has an annular slope 223 and an annular upright surface 224. The annular upright surface 224 and the annular slope 223 are respectively disposed on two opposite sides of the glue-cutting segment 22. From the front view or the side view, the annular slope 223 is an inclined line, and the annular upright surface 224 is an upright line. The annular slope 223 makes a thickness of the glue-cutting segment 22 (a distance between the transverse outer surface 221 and the transverse inner surface 222) gradually decrease in a direction away from the frame body 21.

The annular slope 223 is formed on the transverse outer surface 221, and the annular upright surface 224 is formed on the transverse inner surface 222 as shown in FIG. 5. Or on the contrary, the annular upright surface 224 is formed on the transverse outer surface 221, and the annular slope 223 is formed on the transverse inner surface 222 as shown in FIG. 7.

Figure 8:
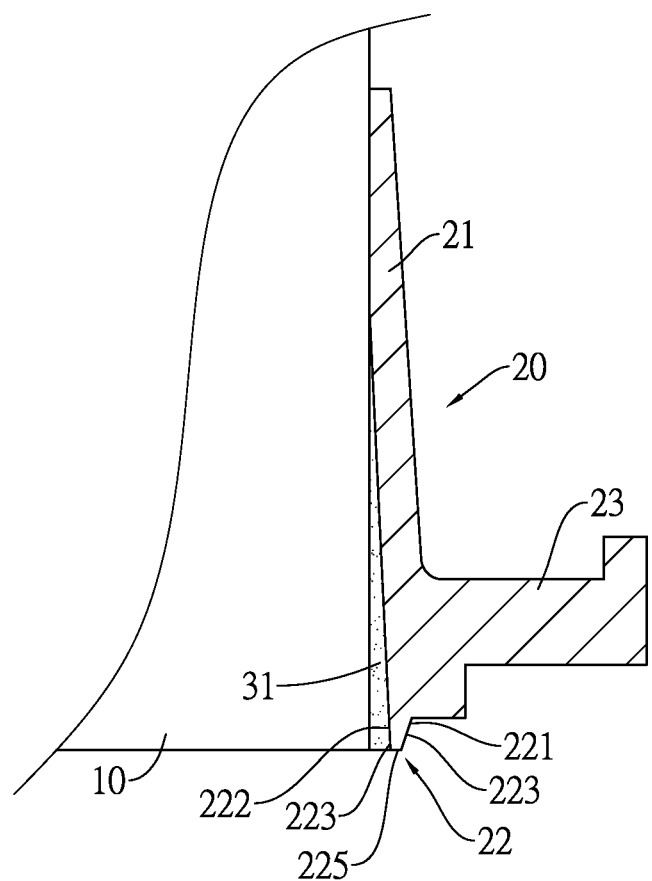
FIG. 8 is a side view in partial section of still another preferred embodiment of the filter cartridge in FIG. 1.
Figure 11:
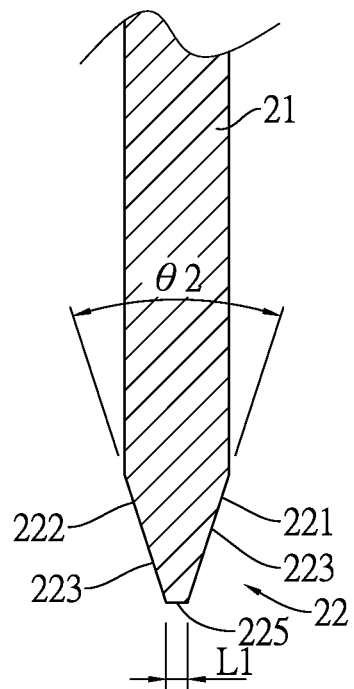
Figure 12:
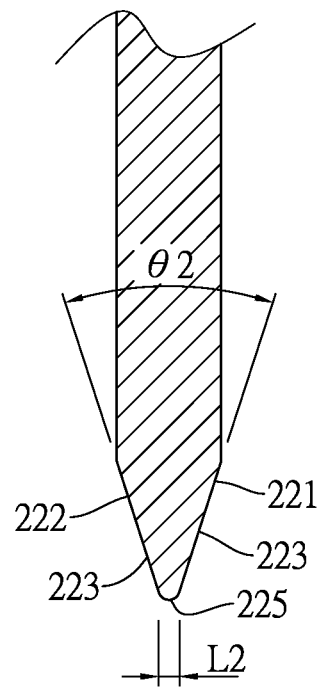

With reference to FIGS. 8, 11, and 12, in another preferred embodiment, the glue-cutting segment 22 has two annular slopes 223 but without any annular upright surface 224. The two annular slopes 223 are respectively formed on the transverse outer surface 221 and the transverse inner surface 222.

Figure 9:
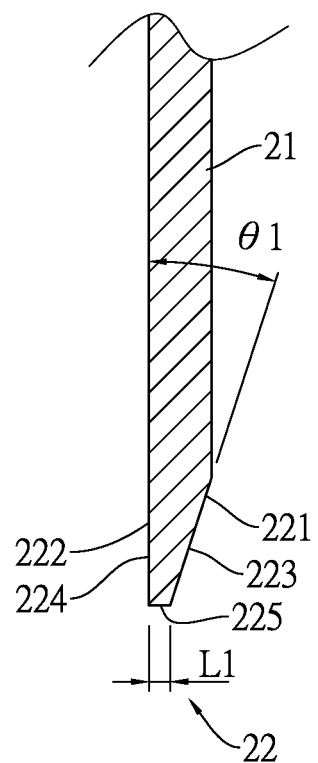
FIGS. 9 to 12 are side views in partial section of four preferred embodiments of the filter cartridge in FIG. 1.
Figure 10:
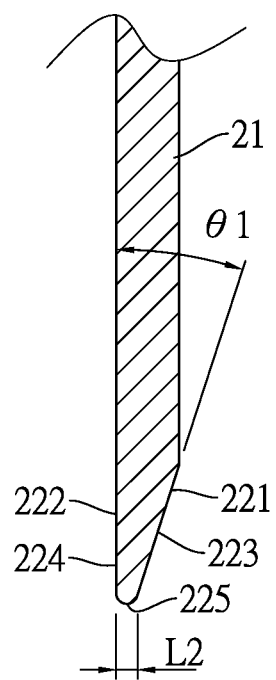

With reference to FIGS. 9 to 12, in addition, an end edge 225 of the glue-cutting segment 22 may be a plane as shown in FIGS. 9 and 11, or a curved surface protruding outward as shown in FIGS. 10 and 12, regardless that the glue-cutting segment 22 has one or two annular slopes 223.

Figure 7:
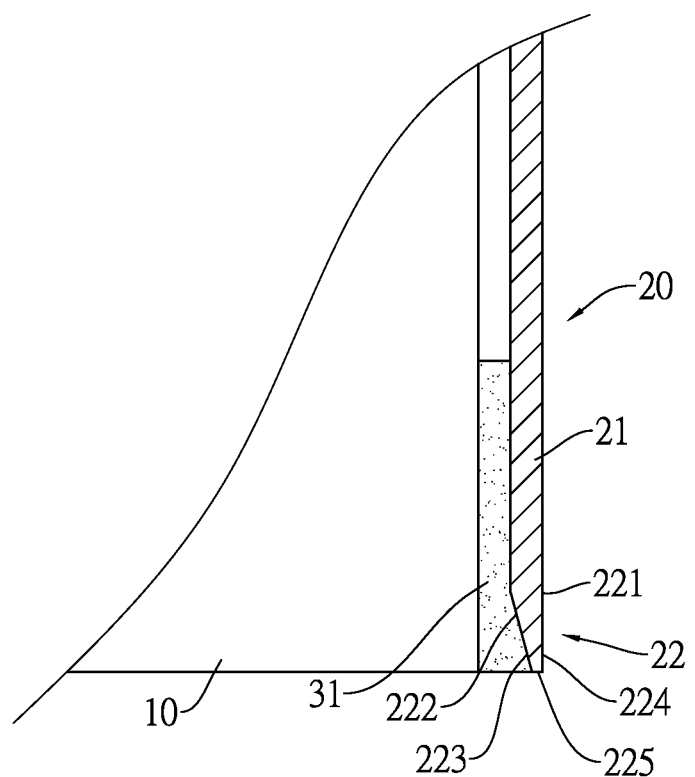
FIG. 7 is a side view in partial section of another preferred embodiment of the filter cartridge in FIG. 1.

With reference to FIGS. 9 and 10, furthermore, in the preferred embodiment with one single annular slope 223, an angle $\theta_1$ between the annular slope 223 and the annular upright surface 224 is between 0 and 90 degrees, end points exclusive, regardless that the annular slope 223 is disposed on the transverse outer surface 221 or disposed on the transverse inner surface 222 as shown in FIG. 7. With reference to FIGS. 11 and 12, in the preferred embodiment with two annular slopes 223, an angle $\theta_2$ between the two annular slopes 223 is between 0 and 180 degrees, end points exclusive.

With reference to FIGS. 9 and 11, regardless that the glue-cutting segment 22 has one or two annular slopes 223, when the end edge 225 of the glue-cutting segment 22 is a plane, a width L1 of the end edge 225 is smaller than a thickness of the frame body 21. Preferably, the width L1 is from 0.5 to 2 mm With reference to FIGS. 10 and 12, when the end edge 225 is a curved surface protruding outward, a diameter L2 of the curved surface is smaller than the thickness of the frame body 21. Preferably, the diameter L2 is from 0.5 to 2 mm.

However, the shape, the structure, and the size of the glue-cutting segment 22 are by no means limited by the abovementioned, as long as the glue-cutting segment 22 can cut the glue 30 into an inner part and an outer part when pressing the glue 30.

With reference to FIGS. 1 and 5, the flange 23 annularly protrudes from an outer wall of the frame body 21 at a position adjacent to the glue-cutting segment 22.

In a preferred embodiment, the end edge 225 of the glue-cutting segment 22, the transverse outer surface 221 (the annular slope 223 or the annular upright surface 224) of the glue-cutting segment 22, the outer wall of the frame body 21 at a position next to the glue-cutting segment 22, and a surface of the flange 23 toward the glue-cutting segment 22 are coated with a release agent.

The glue 30 is coated between the filter frame 20 and the filter core 10, and extends from a position between the outer wall of the filter core 10 and the frame body 21 to a position between the outer wall of the filter core 10 and the glue-cutting segment 22. An axial outer end surface 311 of the glue 30 is aligned with the end edge 225 of the glue-cutting segment 22 as shown in FIG. 5. In a preferred embodiment, the axial outer end surface 311 of the glue 30 and the end edge 225 of the glue-cutting segment 22 are aligned with one of two axial outer end surfaces of the filter core 10 as shown in FIG. 5. That is, the glue 30 seals the filter core 10 at one of two end openings of the filter core 10. However, the sealing position of the filter core 10 is not limited. The shape of the filter frame 20 and the mounting position of the filter frame 20 around the filter core 10 may be altered to make the glue 30 disposed in any axial position on the filter core 10. Furthermore, even though the glue 30 seals the filter core 10 at one of the two end openings of the filter core 10, the glue 30 may be in the inlet or the outlet of the filter core 10. In a preferred embodiment, the glue 30 is, but not limited to, a hot-melt adhesive, and preferably the hot-melt adhesive of model number 393J.

Figure 13:
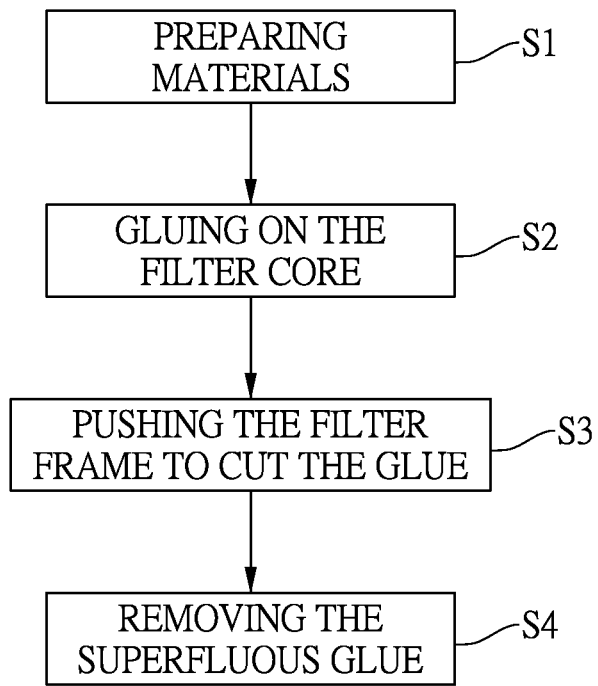
FIG. 13 is a flow chart of the first embodiment of the assembling method of a filter cartridge in FIG. 2.

With reference to FIG. 13, a first embodiment of an assembling method of a filter cartridge in accordance with the present invention comprises the following steps.

The first step (S1) is to prepare materials. A filter core 10 and a filter frame 20 are prepared. The filter frame 20 has a frame body 21 and a glue-cutting segment 22. The frame body 21 is annular and has two end openings. The glue-cutting segment 22 is annularly formed around an edge of one of the two end openings of the frame body 21. In a preferred embodiment, the filter core 10 and the filter frame 20 are preferably, but not limited to, identical to the aforementioned filter core 10 and the filter frame 20, and thus the detailed structure of the filter core 10 and the filter frame 20 are not repeated.

Figure 2:
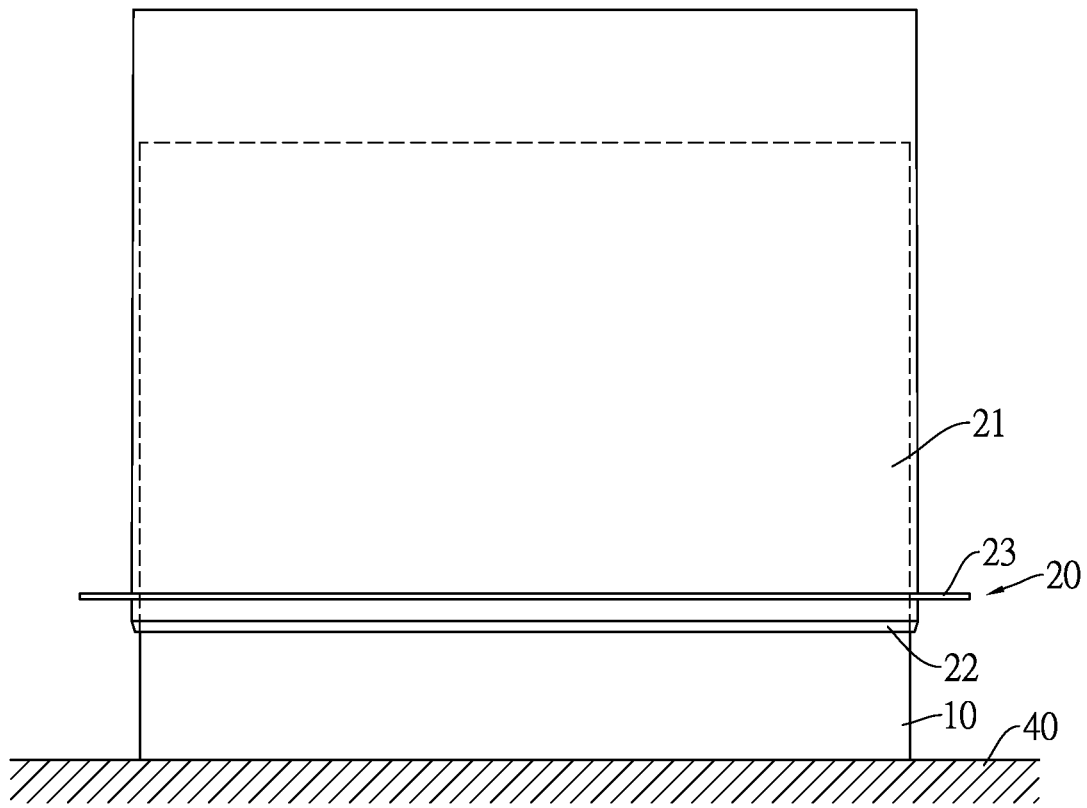
FIGS. 2 to 4 are side views of a first embodiment of an assembling method of a filter cartridge in accordance with the present invention, respectively showing a first act to a third act.

The second step (S2) is to glue the filter core 10. With reference to FIG. 2, the filter core 10 is put on a plane 40, and the filter frame 20 is mounted around the filter core 10 with the glue-cutting segment 22 positioned downward. Part of the filter core 10 protrudes downward and out of the glue-cutting segment 22. In a preferred embodiment, a protruding length of the filter core 10 is preferably, but not limited to, about 10 cm.

In a preferred embodiment, then the end edge 225 of the glue-cutting segment 22, the transverse outer surface 221 of the glue-cutting segment 22, the outer wall of the frame body 21 at a position next to the glue-cutting segment 22, and a surface of the flange 23 toward the glue-cutting segment 22 are coated with a release agent. But this step also can be implemented without any release agent.

Figure 3:
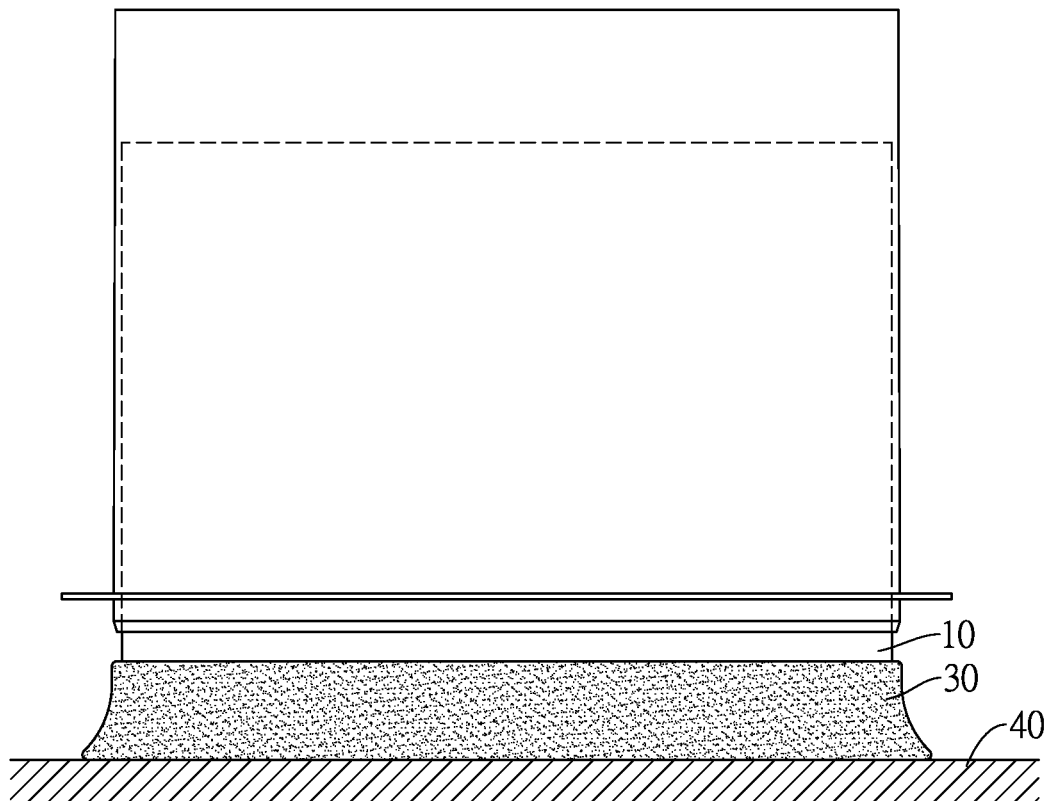

With reference to FIG. 3, then the glue 30 is coated on an outer wall of protruding part of the filter core 10 and the plane 40 at a position next to the filter core 10. In a preferred embodiment, a height of the glue 30 coated on the filter core 10 is preferably, but not limited to, about 5 cm. In addition, the annular coating of the glue 30 is preferably done by, but not limited to, the following method. The filter core 10 is mounted on a rotatable platform, and a glue gun is at a fixed position. Then the filter core 10 is rotated to make the glue gun annularly coat glue around an outer wall of the filter core 10.

Figure 4:
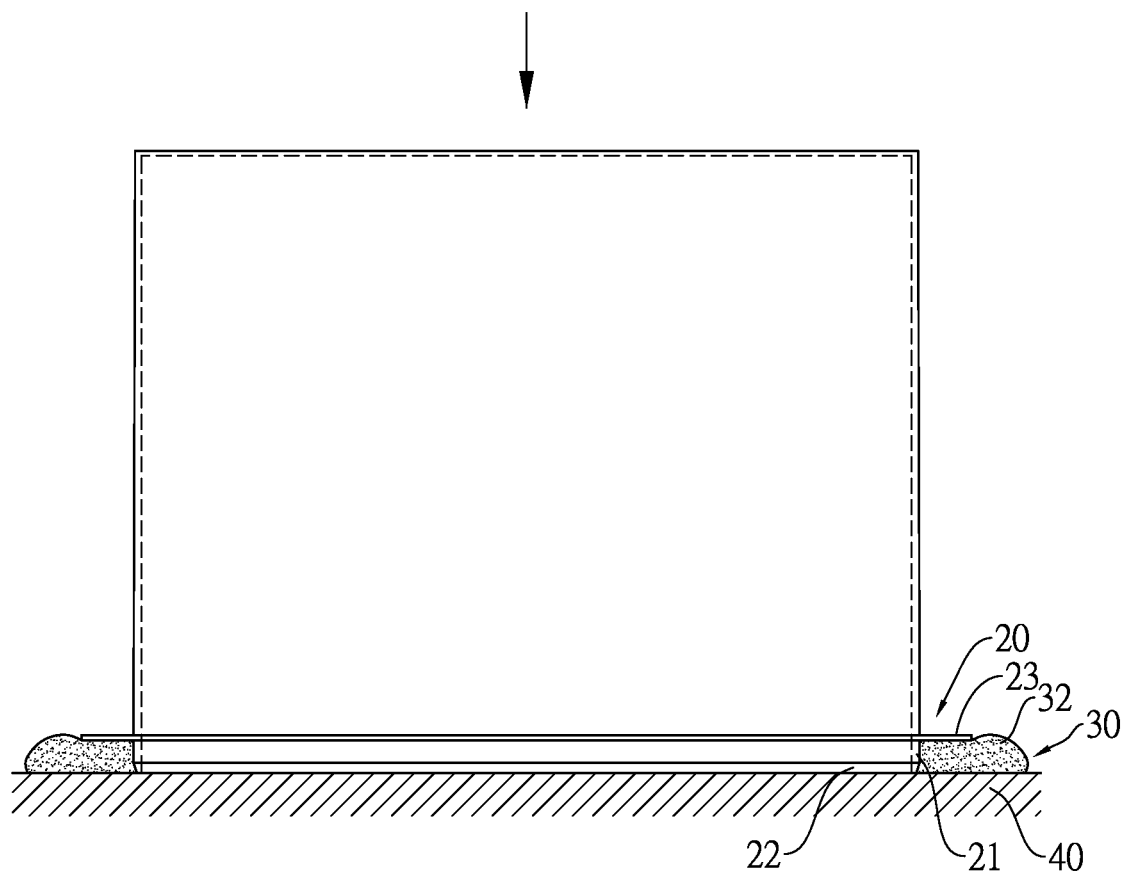

The third step (S3) is to push the filter frame 20 to cut the glue 30. With reference to FIGS. 4 and 5, the filter frame 20, which is mounted around the filter core 10, is pushed toward the glue 30 and the plane 40. In a preferred embodiment, the filter frame 20 is pushed downward until the glue-cutting segment 22 presses the glue 30 and abuts against the plane 40. At this time, the glue 30 is cut into an inner glue part 31 and an outer glue part 32. The inner glue part 31 is disposed between the filter core 10 and the filter frame 20. The outer glue part 32 is disposed on an outer side of the filter frame 20. In a preferred embodiment, the filter frame 20 is pushed by, but not limited to, a pneumatic cylinder.

Figure 6:
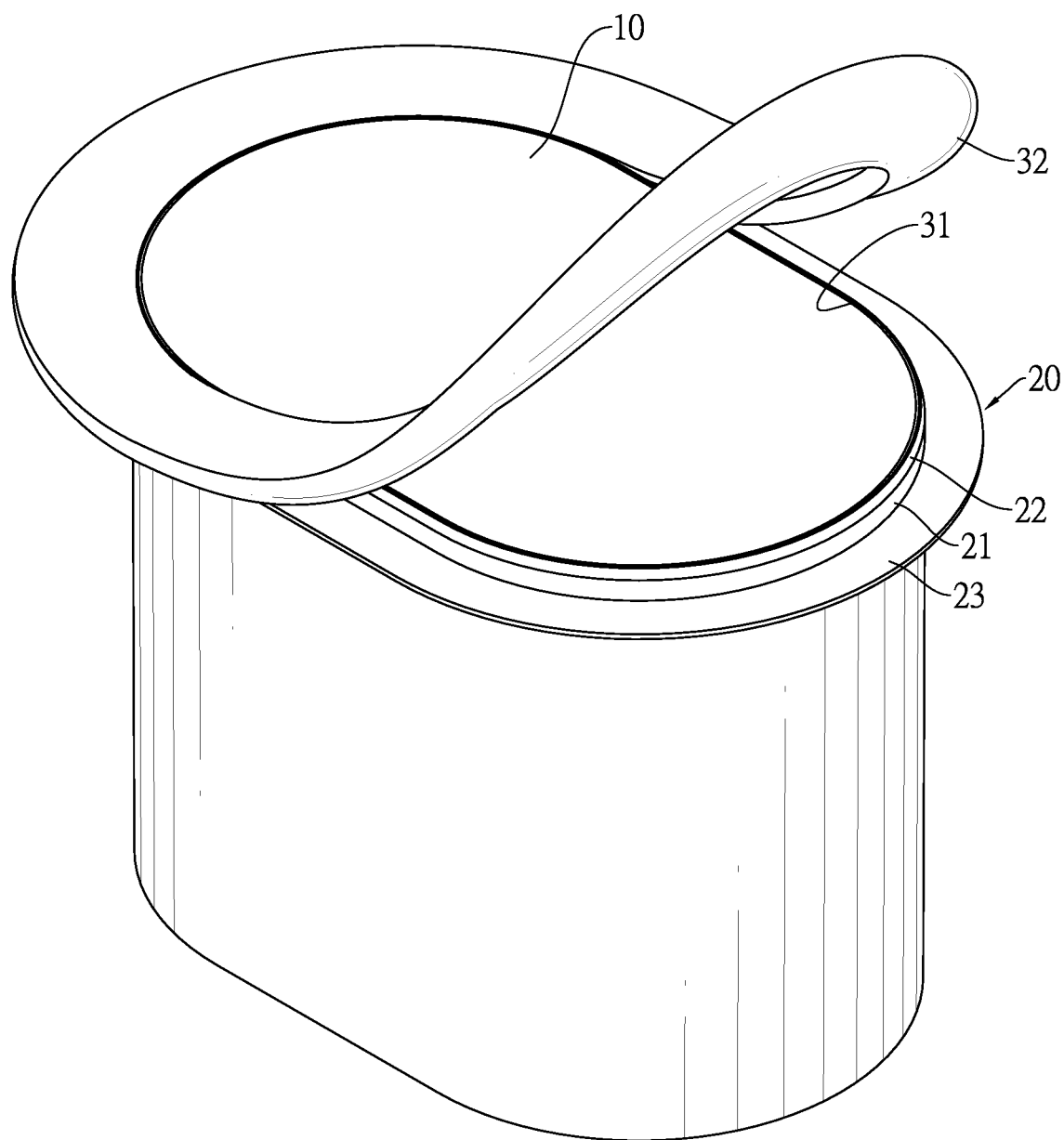
FIG. 6 is a side view of the first embodiment of the assembling method of a filter cartridge in FIG. 2, showing a fourth act.

The fourth step (S4) is to remove the superfluous glue. With reference to FIG. 6, the outer glue part 32 disposed on the outer side of the filter frame 20 is removed. In a preferred embodiment, since the position where the glue 30 is attached to the filter frame 20 is coated with the release agent, the outer glue part 32 does not stick to the filter frame 20 and can be torn off. After the outer glue part 32 is removed, the assembling of the filter cartridge is finished.

With reference to FIGS. 14 to 17, a second embodiment of the assembling method is substantially similar to the first embodiment mentioned above, but has the following difference.

Figure 14:
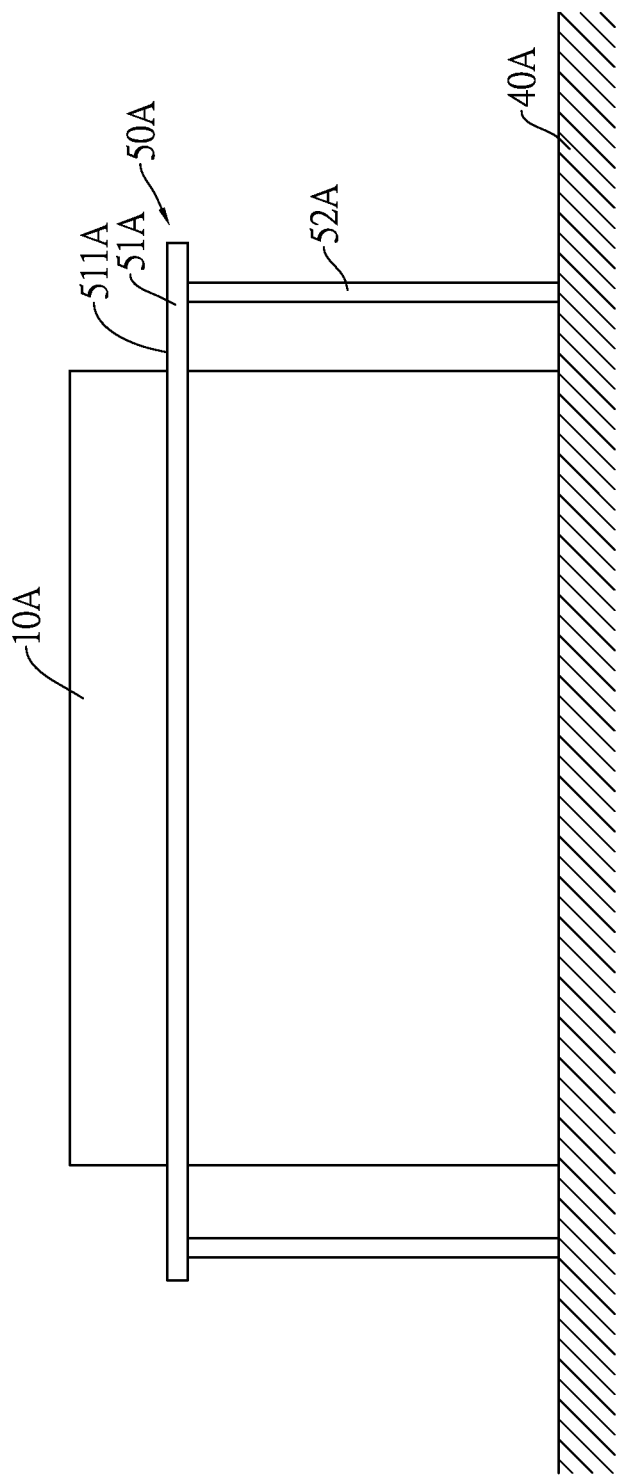
FIGS. 14 to 17 are side views of a second embodiment of an assembling method of a filter cartridge in accordance with the present invention, respectively showing a first act to a fourth act.

In the first step (S1), with reference to FIG. 14, a supporting frame 50A is additionally prepared. The supporting frame 50A has a supporting panel 51A and multiple feet 52A. The supporting panel 51A has an accommodating hole. An inner diameter of the accommodating hole is equal to an outer diameter of the filter core 10A. The feet 52A are mounted on a bottom of the supporting panel 51A.

Figure 15:
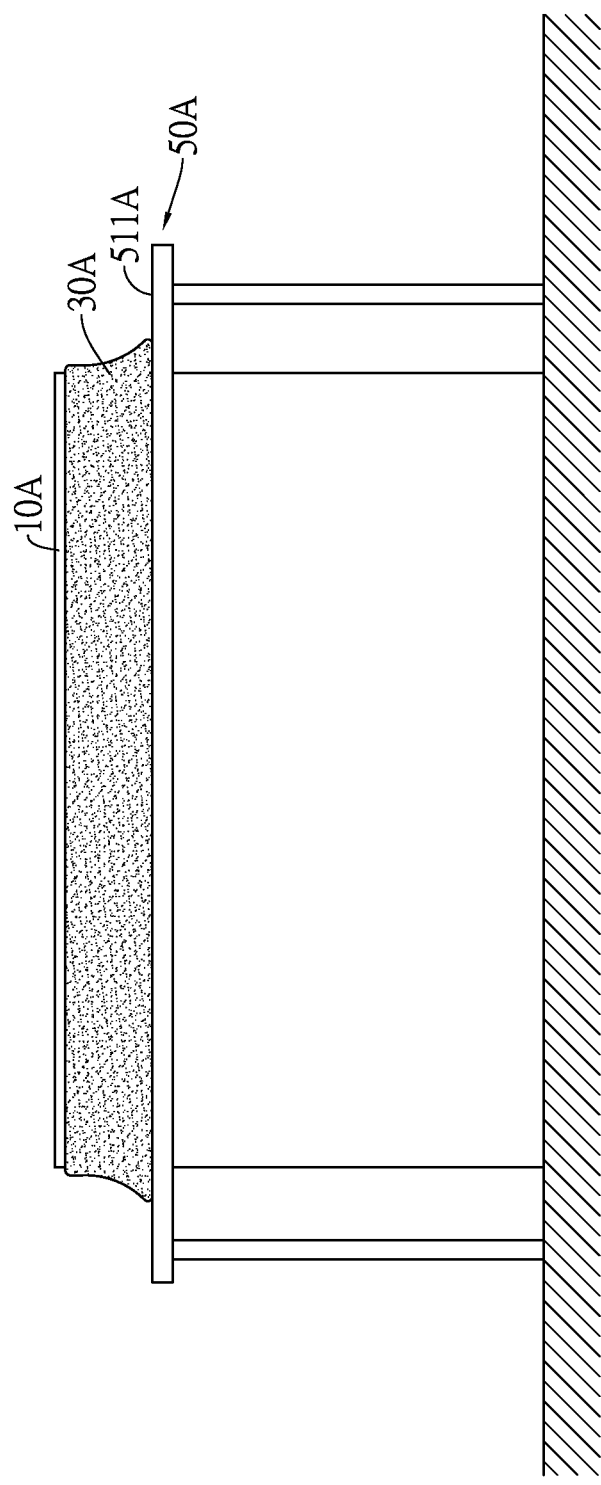

In the second step (S2), the supporting frame 50A is put on the plane 40A, and the filter core 10A is mounted in the accommodating hole of the supporting panel 51A. A part of the filter core 10A protrudes upward and out of the accommodating hole. With reference to FIG. 15, then the glue 30A is coated on an outer wall of the part of the filter core 10A that protrudes out of the accommodating hole 511A and a top surface 511A of the supporting panel 51A at a position next to the filter core 10A.

Figure 16:
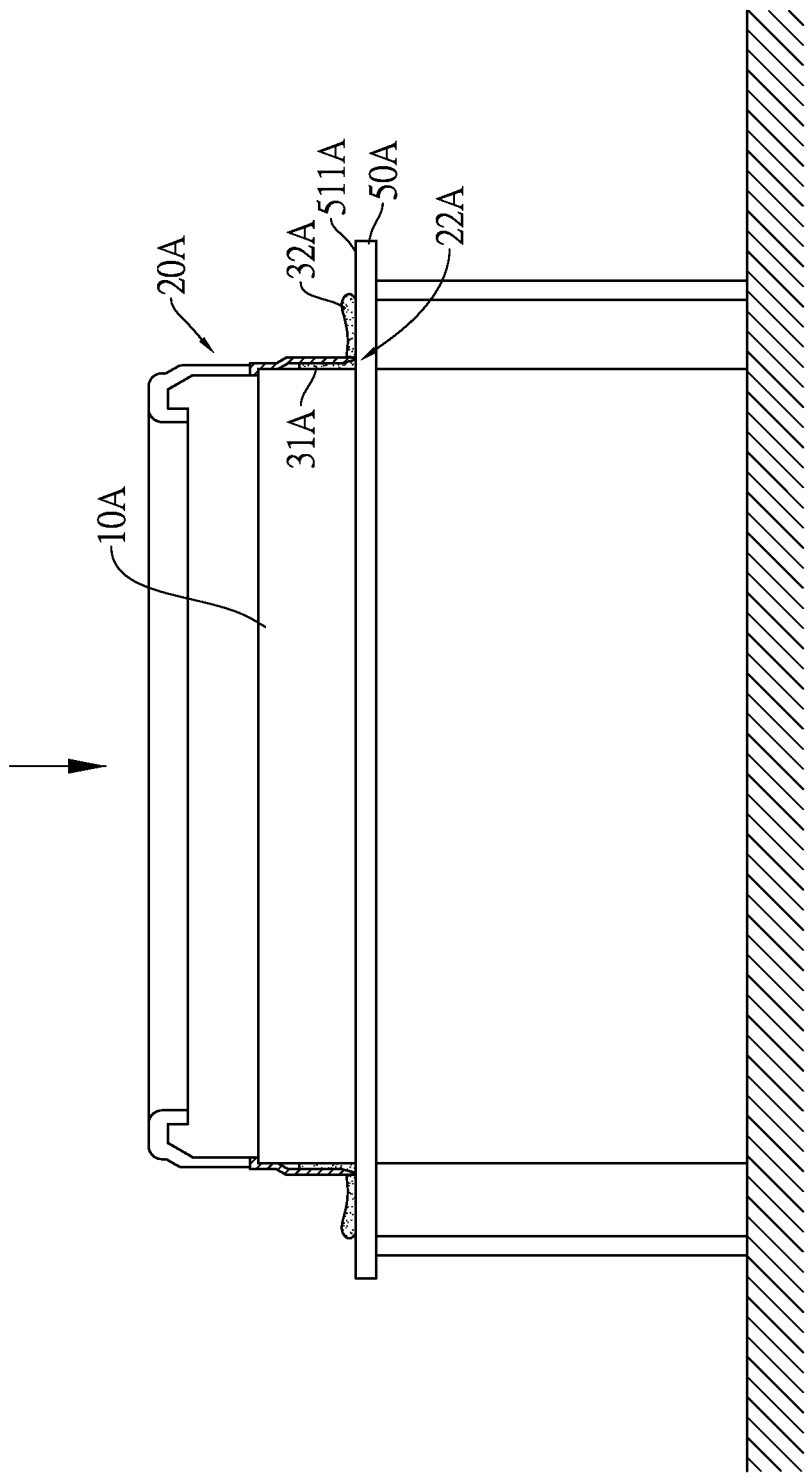

In the third step (S3), with reference to FIG. 16, the filter frame 20A is not mounted around the filter core 10A until the third step. When mounting the filter frame 20A around the filter core 10A, the filter frame 20A is pushed down and toward the glue 30A and the supporting panel 51A directly until the glue-cutting segment 22A presses the glue 30A and abuts against the top surface 511A of the supporting panel 51A. At this time, the glue 30A is cut into an inner glue part 31A and an outer glue part 32A. Both the inner glue part 31A and the outer glue part 32A are disposed on the top surface 511A of the supporting panel 51A.

Figure 17:
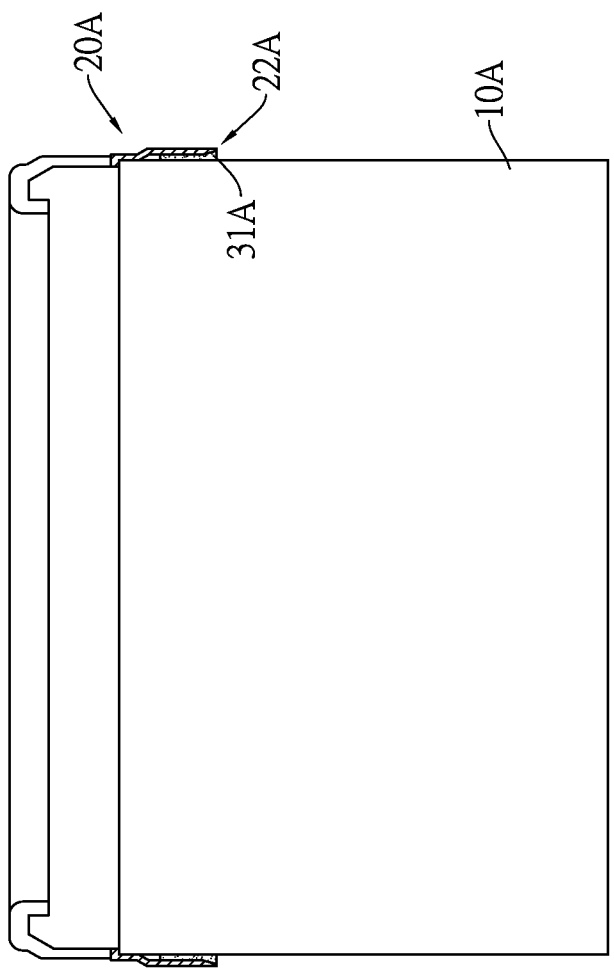

With reference to FIG. 17, finally, the outer glue part 32A is removed in the fourth step (S4).

By the aforementioned method of the second embodiment, the filter frame 20A and the glue 30A can be disposed in any axial position on the filter core 10A to meet various demands.

In the preferred embodiment with one single annular slope 223, when the annular slope 223 is disposed in the transverse outer surface 221, the inner glue part 31 is disposed between the outer wall of the filter core 10 and the annular upright surface 224. When the annular slope 223 is disposed in the transverse inner surface 222 or in the preferred embodiment with two annular slopes 223, the inner glue part 31 is disposed between the outer wall of the filter core 10 and the annular slope 223. In either situation mentioned above, the inner glue part 31 can fill up the gap between the filter core 10 and the glue-cutting segment 22 to achieve the effective sealing.

The filter core 10 is coated with glue in advance and the glue 30 is cut by the glue-cutting segment 22 to achieve the sealing when mounting the filter frame 20 on the filter core 10, thereby effectively reducing the time and effort to coat glue.

In addition, the glue 30 is coated on the outer wall of the filter core 10 before the filter frame 20 is mounted around the filter core 10, such that it does not need a wide gap disposed between the filter core 10 and the filter frame 20. Thus, the filter frame 20 can be installed with larger filter core 10 to increase the filtering area.

Furthermore, narrowing the gap between the filter frame 20 and the filter core 10 also decreases the amount of the glue 30 to seal the gap, and the removed glue 30 (the outer glue part 32) also can be recycled. As a result, the present invention also can save the use of glue 30.

In addition, in the first embodiment of the assembling method, the filter frame 20 is mounted around the filter core 10 before the glue 30 is coated. But in the second embodiment, the filter core 10A is coated with the glue 30A before the filter frame 20A is mounted on the filter core 10A. The sequence of mounting the filter frame 20 and coating the glue 30 is not limited and can be altered in the two embodiments.

Furthermore, in the two embodiments of the assembling method, the filter frame 20 is pushed downward to cut the glue. However, the pushing direction of the filter frame 20 is not limited. That is, the filter frame 20 also can be pushed transversely to cut the glue 30, as long as the filter core 10 is put in the corresponding direction and the filter frame 20 is pushed toward the glue 30.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An assembling method of a filter cartridge comprising:
   (a) preparing materials, wherein a filter core and a filter frame are prepared; the filter frame has a frame body and a glue-cutting segment; the frame body is annular and has two end openings; the glue-cutting segment is annularly formed around an edge of one of the two end openings of the frame body;
   (b) coating glue around an outer wall of the filter core;
   (c) pushing the filter frame to cut the glue, wherein the filter frame, which is mounted around the filter core, is pushed toward the glue to make the glue-cutting segment press the glue until the glue is cut into an inner glue part and an outer glue part; the inner glue part is disposed between the filter core and the filter frame, and the outer glue part is disposed on an outer side of the filter frame; and
   (d) removing the outer glue part disposed on the outer side of the filter frame.

2. The assembling method as claimed in claim 1, wherein
   in step (b), the filter core is put on a plane, and the glue is coated on the outer wall of the filter core and the plane at a position next to the filter core; and
   in step (c), the filter frame is pushed toward the plane until the glue-cutting segment abuts against the plane.

3. The assembling method as claimed in claim 1, wherein
   in step (a), a supporting frame is prepared, and the supporting frame has a supporting panel and multiple feet; the supporting panel has an accommodating hole, and an inner diameter of the accommodating hole is equal to an outer diameter of the filter core; the feet are mounted on a bottom of the supporting panel;
   in step (b), the filter core is mounted in the accommodating hole of the supporting panel, and a part of the filter core protrudes out of the accommodating hole; the glue is coated on an outer wall of the part of the filter core that protrudes out of the accommodating hole and a top surface of the supporting panel at a position next to the filter core; and
   in step (c), the filter frame is pushed toward the supporting panel until the glue-cutting segment abuts against the top surface of the supporting panel.

* * * * *